(12) United States Patent
Imura et al.

(10) Patent No.: US 10,388,456 B2
(45) Date of Patent: Aug. 20, 2019

(54) DIELECTRIC COMPOSITION, DIELECTRIC ELEMENT, ELECTRONIC COMPONENT AND LAMINATED ELECTRONIC COMPONENT

(71) Applicant: TDK Electronics AG, München (DE)

(72) Inventors: Tomoya Imura, Tokyo (JP); Tomohiro Terada, Tokyo (JP)

(73) Assignee: TDK ELECTRONICS AG, München (DE)

( * ) Notice: Subject to any disclaimer, the term of this patent is extended or adjusted under 35 U.S.C. 154(b) by 0 days.

(21) Appl. No.: 15/577,306

(22) PCT Filed: May 24, 2016

(86) PCT No.: PCT/EP2016/061701
§ 371 (c)(1),
(2) Date: Nov. 27, 2017

(87) PCT Pub. No.: WO2016/189003
PCT Pub. Date: Dec. 1, 2016

(65) Prior Publication Data
US 2018/0158612 A1 Jun. 7, 2018

(30) Foreign Application Priority Data

May 27, 2015 (JP) .................................. 2015-107731
Dec. 28, 2015 (JP) .................................. 2015-256458

(51) Int. Cl.
*C04B 35/475* (2006.01)
*H01G 4/12* (2006.01)
(Continued)

(52) U.S. Cl.
CPC ......... *H01G 4/1227* (2013.01); *C04B 35/462* (2013.01); *C04B 35/47* (2013.01);
(Continued)

(58) Field of Classification Search
CPC ........................... C03B 35/475; H01G 4/1227
See application file for complete search history.

(56) References Cited

U.S. PATENT DOCUMENTS 3,468,680 A 9/1969 Fujiwara
4,119,554 A 10/1978 Fujiwara
(Continued)

FOREIGN PATENT DOCUMENTS

EP 1094477 A2 4/2001
FR 2276278 A1 1/1976
(Continued)

OTHER PUBLICATIONS

Herabut, A., et al., Effects of Substitution in A- and B-site Cations of Bi0.5Na0.5TiO3, Dept. of Ceramic Science and Engineering, IEEE, 1996, pp. 775-778.
(Continued)

*Primary Examiner* — Karl E Group
(74) *Attorney, Agent, or Firm* — Slater Matsil, LLP

(57) ABSTRACT

A dielectric composition, a dielectric element, an electronic component and a laminated electronic component are disclosed. In an embodiment the dielectric composition includes a perovskite compound comprising a main component having Bi, Na, Sr, Ln and Ti, wherein Ln is at least one type of a rare earth element, and wherein a mean crystal grain size is between 0.1 μm and 1 μm.

19 Claims, 1 Drawing Sheet

(51) Int. Cl.
*H01G 4/228* (2006.01)
*C04B 35/64* (2006.01)
*C04B 35/638* (2006.01)
*C04B 41/45* (2006.01)
*C04B 41/00* (2006.01)
*C04B 41/51* (2006.01)
*C04B 41/88* (2006.01)
*H01G 4/30* (2006.01)
*C04B 35/462* (2006.01)
*C04B 35/47* (2006.01)
*C04B 35/626* (2006.01)

(52) U.S. Cl.
CPC ...... *C04B 35/475* (2013.01); *C04B 35/62685* (2013.01); *C04B 35/638* (2013.01); *C04B 35/64* (2013.01); *C04B 41/009* (2013.01); *C04B 41/4578* (2013.01); *C04B 41/5111* (2013.01); *C04B 41/88* (2013.01); *H01G 4/1218* (2013.01); *H01G 4/228* (2013.01); *H01G 4/30* (2013.01); *C04B 2235/3201* (2013.01); *C04B 2235/3203* (2013.01); *C04B 2235/3206* (2013.01); *C04B 2235/3213* (2013.01); *C04B 2235/3224* (2013.01); *C04B 2235/3225* (2013.01); *C04B 2235/3227* (2013.01); *C04B 2235/3236* (2013.01); *C04B 2235/3262* (2013.01); *C04B 2235/3277* (2013.01); *C04B 2235/3281* (2013.01); *C04B 2235/3284* (2013.01); *C04B 2235/3298* (2013.01); *C04B 2235/5445* (2013.01); *C04B 2235/602* (2013.01); *C04B 2235/612* (2013.01); *C04B 2235/656* (2013.01); *C04B 2235/6582* (2013.01); *C04B 2235/768* (2013.01); *C04B 2235/785* (2013.01)

(56) References Cited

U.S. PATENT DOCUMENTS

| | | | |
|---|---|---|---|
| 7,898,793 B2 | 3/2011 | Ito et al. | |
| 8,154,851 B2 | 4/2012 | Fukuda | |
| 8,786,167 B2* | 7/2014 | Kounga Njiwa | H01L 41/187 310/358 |
| 9,054,310 B2 | 6/2015 | Hoffmann et al. | |
| 9,275,797 B2 | 3/2016 | Suzuki et al. | |
| 9,530,563 B2* | 12/2016 | Imura | H01G 4/1218 |
| 9,570,669 B2 | 2/2017 | Glazunov et al. | |
| 10,099,964 B2* | 10/2018 | Tauchi | C04B 35/462 |
| 2008/0242532 A1 | 10/2008 | Nishikawa | |
| 2017/0029337 A1* | 2/2017 | Imura | C04B 35/462 |
| 2017/0032893 A1* | 2/2017 | Tauchi | C04B 35/462 |
| 2017/0190627 A1* | 7/2017 | Tauchi | C04B 35/462 |
| 2017/0243696 A1* | 8/2017 | Hirose | C04B 35/47 |

FOREIGN PATENT DOCUMENTS

| | | | |
|---|---|---|---|
| JP | 2001192264 A | | 7/2001 |
| JP | 2003292374 A | | 10/2003 |
| JP | 2005022891 A | * | 1/2005 |
| JP | 2005183491 A | | 7/2005 |
| JP | 2008147497 A | | 6/2008 |
| JP | 2013542161 A | | 11/2013 |
| JP | 2014189465 A | | 10/2014 |
| JP | 2014529902 A | | 11/2014 |
| WO | 2005090260 A1 | | 9/2005 |
| WO | 2007026614 A1 | | 3/2007 |
| WO | 2012128175 A1 | | 9/2012 |
| WO | 2014156302 A1 | | 2/2014 |

OTHER PUBLICATIONS

Parija, B., et al., "Structure, microstructure and dielectric properties of 100-x (Bi0.5Na0.5)TiO3-x [SrTiO3] composites ceramics," Applied Physics A, Materials Science & Processing, Aug. 25, 2012, vol. 109, No. 3, pp. 715-723.

Vintila, R., et al., "Effect of A-Site Substitutions on the Microstructure and Dielectric Properties of Bismuth Sodium Titanate-Based Ceramics Exhibiting Morphotropic Phase Boundary," Advances in Electronic Ceramic Materials, a collection of papers presented at the 29th int'l conference, Jan. 23-28, 2005; vol. 26, No. 5, pp. 117-124.

Wang, L., et al., "Dielectric and Piezoelectric Properties of Lead-free BaTiO3—Bi(Zn0.5Ti0.5)O3 and (Bi0.5Na0.5) TiO3—Bi(Zn0.5Ti0.5)O3 Ceramics," Ferroelectrics, Taylor and Francis Inc., vol. 380, Jan. 1, 2009, pp. 177-182.

\* cited by examiner

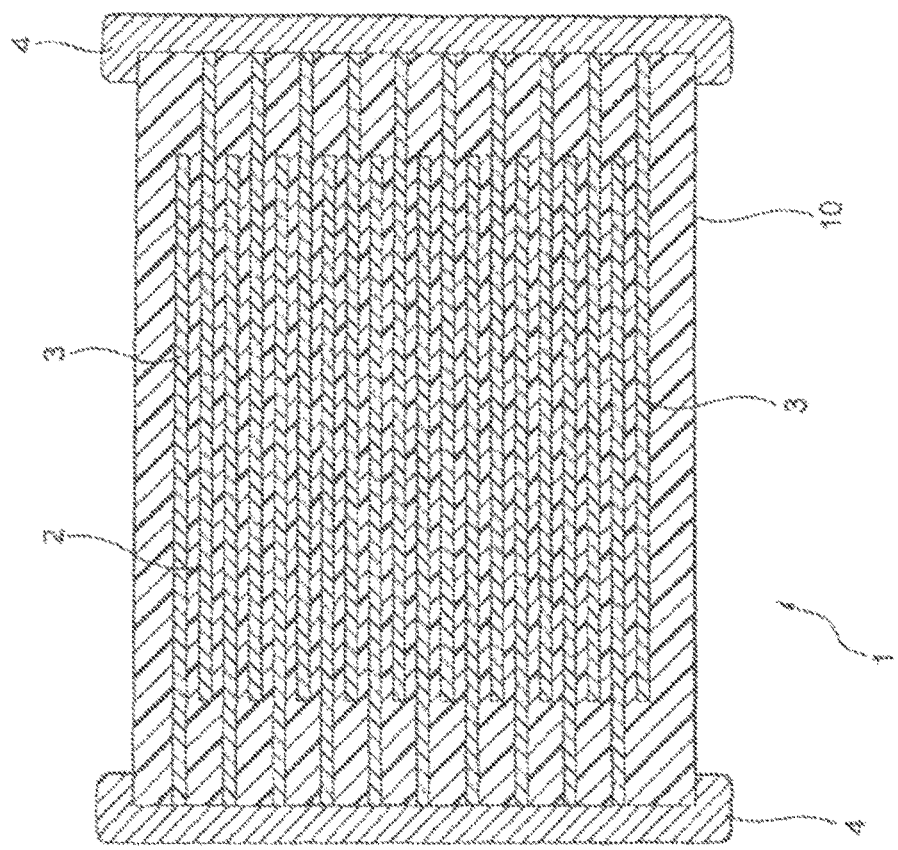

DIELECTRIC COMPOSITION, DIELECTRIC ELEMENT, ELECTRONIC COMPONENT AND LAMINATED ELECTRONIC COMPONENT

This patent application is a national phase filing under section 371 of PCT/EP2016/061701, filed May 24, 2016, which claims the priority of Japanese patent application 2015-107731, filed May 27, 2015 and Japanese patent application 2015-256458, filed Dec. 28, 2015, each of which is incorporated herein by reference in its entirety.

TECHNICAL FIELD

The present invention relates to a dielectric composition, a dielectric element, an electronic component and a laminated electronic component which are advantageously used for medium- and high-voltage applications with a high rated voltage, and are also advantageously used under a high-temperature environment.

BACKGROUND

Laminated electronic components such as laminated ceramic capacitors are widely used as compact, large-capacity and highly reliable electronic components. As devices have become more compact and higher performing in recent years, there has been an increasingly strong demand for further miniaturization, increased capacity, lower cost and greater reliability in electronic components and especially in laminated electronic components such as laminated ceramic capacitors.

Laminated ceramic capacitors are normally produced by laminating a paste for internal electrode layers and a paste for dielectric layers using a sheet process or a printing process etc., and then simultaneously baking the internal electrode layers and the dielectric layers in the laminated body.

A barium titanate-based dielectric composition comprising barium titanate as the main component which has a high dielectric constant is conventionally widely known as a dielectric composition which is used for the dielectric layer. There is a problem with a barium titanate-based dielectric composition, however, in that the insulation resistance thereof deteriorates markedly at high temperatures of 100° C. or above.

Furthermore, a capacitor may be used with a DC voltage superimposed on an AC voltage. The DC bias characteristics are important when a capacitor is used with a DC voltage superimposed on an AC voltage. The DC bias characteristics express a change in the dielectric constant which is dependent on application of a DC voltage. The DC bias characteristics are higher the smaller the change in the dielectric constant with respect to application of a DC voltage. It is known that a capacitor employing a conventional barium titanate-based dielectric composition has low DC bias characteristics, and the greater the DC voltage, the lower the dielectric constant.

In addition, when the dielectric layer is made thinner in order to make the laminated ceramic capacitor more compact and to increase the capacity thereof, the electric field applied to the dielectric layer becomes more intense when a DC voltage is applied, so there is a further drop in the DC bias characteristics.

Furthermore, Pd or Pd alloy is generally used as the conductive material of the internal electrode layers in the laminated ceramic capacitor. However, Pd is costly so in recent years use has also been made of relatively inexpensive base metals such as Ni and Cu.

When a base metal such as Ni or Cu is used as the conductive material of the internal electrode layer, the internal electrode layer oxidizes when baking is carried out under the atmosphere. This means that it is necessary for the dielectric layer and the internal electrode layer to be simultaneously baked under a reducing atmosphere. When baking is carried out under a reducing atmosphere, however, the dielectric layer is reduced and there is a drop in insulation resistance.

In view of this, there is a need for a non-reducing dielectric composition which has excellent DC bias characteristics and has high insulation resistance at high temperatures.

As a means for resolving this situation, for example, Japanese Patent JP 3334607 describes a laminated ceramic capacitor which has good DC bias characteristics and high insulation resistance at high temperatures, and a barium titanate-based dielectric composition which is suitable for the laminated ceramic capacitor.

However, although the dielectric constant of the dielectric composition in Patent Japanese Patent JP 3334607 is relatively high at around 900-950 when a DC electric field of 5 V/μm is applied, the dielectric constant decreases when an even higher DC electric field is applied, so the DC bias characteristics are inadequate to cope with the thinning of the layers which accompanies a reduction in size and increased capacity.

Furthermore, the dielectric composition in Japanese Patent JP 3334607 has relatively high insulation resistance at a high temperature of 150° C. However, this is still inadequate in comparison with the magnitude of insulation resistance required in recent years.

SUMMARY OF THE INVENTION

Embodiments provide a dielectric composition which has excellent DC bias characteristics and high insulation resistance at high temperatures. Further embodiments provide a dielectric element, an electronic component and a laminated electronic component.

Various embodiments provide a dielectric composition having a perovskite compound in which the main component comprises Bi, Na, Sr, Ln and Ti, and the Ln is at least one type of rare earth element, characterized in that the mean crystal grain size is between 0.1 μm and 1 μm.

A dielectric composition having this constitution can achieve excellent DC bias characteristics and high insulation resistance at high temperatures.

In various further embodiments, the dielectric composition according to the present invention has a main component represented by $(Bi_aNa_bSr_cLn_d)TiO_3$, where a, b, c and d satisfy the following, respectively: $0<a<0.50$, $0<b<0.50$, $0<c\leq0.80$, $0<d\leq0.20$ and $0.90\leq a+b+c+d\leq1.05$.

The dielectric composition according to embodiments of the present invention preferably contains between 5 molar parts and 18 molar parts of at least one from the group consisting of Li and K as an auxiliary component, with respect to 100 molar parts of Ti contained in the main component.

The dielectric composition according to embodiments of the present invention preferably contains between 0.2 molar parts and 1 molar part of at least one from the group consisting of Cu, Mn, Zn, Mg and Co as an auxiliary component, with respect to 100 molar parts of Ti contained in the main component. As a result, the sintering properties are improved and it is possible to achieve high insulation resistance.

A dielectric element according to embodiments of the present invention comprises the abovementioned dielectric composition.

The dielectric element according to embodiments of the present invention comprises the abovementioned dielectric composition and can therefore be made more compact and higher performing.

An electronic component according to embodiments of the present invention is provided with a dielectric layer comprising the abovementioned dielectric composition.

A laminated electronic component according to embodiments of the present invention has a laminated portion which is formed by alternately laminating an internal electrode layer and a dielectric layer comprising the abovementioned dielectric composition.

The electronic component and the laminated electronic component according to embodiments the present invention are provided with a dielectric layer comprising the abovementioned dielectric composition and can therefore be made more compact and higher performing.

BRIEF DESCRIPTION OF THE DRAWINGS

FIGURE is a schematic diagram of a laminated ceramic capacitor according to a mode of embodiment of the present invention.

DETAILED DESCRIPTION OF ILLUSTRATIVE EMBODIMENTS

FIGURE shows a laminated ceramic capacitor 1 according to a mode of embodiment of the present invention comprising a capacitor element main body 10 having a structure in which dielectric layers 2 and internal electrode layers 3 are alternately stacked. The internal electrode layers 3 are stacked in such a way that the end surfaces thereof are alternately exposed at the two opposing ends of the capacitor element main body 10. A pair of external electrodes 4 is formed at both ends of the capacitor element main body 10, and are connected to the exposed end surfaces of the alternately-arranged internal electrode layers 3 to form a capacitor circuit.

Is shown in FIG. 1, a laminated ceramic capacitor 1 according to a mode of embodiment of the present invention comprises a capacitor element main body 10 having a structure in which dielectric layers 2 and internal electrode layers 3 are alternately stacked. The internal electrode layers 3 are stacked in such a way that the end surfaces thereof are alternately exposed at the two opposing ends of the capacitor element main body 10. A pair of external electrodes 4 are formed at both ends of the capacitor element main body 10, and are connected to the exposed end surfaces of the alternately-arranged internal electrode layers 3 to form a capacitor circuit.

The capacitor element main body 10 normally has a cuboid shape, but is not particularly limited to this. Furthermore, there is no particular limitation as to the dimensions of the capacitor element main body. In general, the dimensions are normally (long side)×(short side)×(height)=(0.6 mm-70.0 mm)×(0.3 mm-6.4 mm)×(0.3 mm-2.5 mm).

The dielectric layers 2 of the laminated ceramic capacitor 1 according to a mode of embodiment of the present invention comprise a sintered compact formed by crystal grains of a dielectric composition having, as the main component, a perovskite compound including Bi, Na, Sr, Ln (where Ln is a rare earth element) and Ti.

The dielectric composition has a composition according to the following general formula (1), where a, b, c and d satisfy the following, respectively: $0<a<0.50$, $0<b<0.50$, $0<c\leq 0.80$, $0<d\leq 0.20$ and $0.90\leq a+b+c+d\leq 1.05$.

$$(Bi_aNa_bSr_cLn_d)TiO_3 \qquad (1)$$

The reason that the dielectric composition according to the present invention includes Ln (rare earth element) is to improve the dielectric constant and the insulation resistivity of the dielectric composition when a DC bias is applied.

It should be noted that a, b, c and d each represent the ratio of the number of atoms of Bi, Na, Sr and Ln when the number of atoms of Ti is 1.

The reason that a, b, c and d are preferably within the abovementioned ranges in the laminated ceramic capacitor is because a high dielectric constant is exhibited when a DC bias is applied and high insulation resistance is exhibited at high temperatures. Furthermore, it is also because this facilitates suppressing grain growth when the dielectric particles (to be described later) are baked.

It should be noted that the phrase "when a DC bias is applied" means a case in which an AC electric field of between 0.02 V/μm (preferably 0.2 V/μm or greater, more preferably 0.5 V/μm or greater) and 5 V/μm and a DC electric field of between 1 V/μm and 8 V/μm superimposed thereon are applied to the laminated ceramic capacitor. According to the present invention, it is important that the dielectric constant be high even when a DC electric field, in particular of greater than 5 V/μm and no greater than 8 V/μm, is applied.

Furthermore, when a, b, c and d satisfy the following, respectively: $0.20\leq a\leq 0.40$, $0.20\leq b\leq 0.40$, $0.15\leq c\leq 0.50$, $0.90\leq d\leq 0.15$ and $0.90\leq a+b+c+d\leq 1.01$, it is possible to achieve a high dielectric constant when a DC bias is applied and it is possible to achieve high insulation resistance at high temperatures.

The crystal grains (referred to below as "dielectric particles") forming the dielectric layers 2 will be described next.

The dielectric particles form the abovementioned dielectric layers 2 and a feature of the present invention lies in the fact that the mean crystal grain size of the dielectric particles is between 0.10 μm and 1.0 μm. By setting the mean crystal grain size of the dielectric particles at between 0.10 μm and 1.0 μm, the laminated ceramic capacitor 1 which is ultimately produced has excellent DC bias characteristics while also having high insulation resistance even at a high temperature of 150° C. Furthermore, the mean crystal grain size of the dielectric particles contained in the dielectric composition is preferably between 0.10 μm and 0.50 μm. When the mean crystal grain size of the dielectric particles is between 0.10 μm and 0.50 μm, it is possible to achieve a high dielectric constant when a DC bias is applied and to achieve high insulation resistance at high temperatures. The effect of the present invention is particularly pronounced when a, b, c and d satisfy the following, respectively: $0.20\leq a\leq 0.40$, $0.20\leq b\leq 0.40$, $0.15\leq c\leq 0.50$, $0.01\leq d\leq 0.15$ and $0.90\leq a+b+c+d\leq 1.01$ and at the same time the mean crystal grain size of the dielectric particles is between 0.10 μm and 0.50 μm.

The mean crystal grain size of the dielectric particles can be adjusted by a conventional method in this technical field. There is no particular limitation as to the method of adjusting the mean crystal grain size. For example, the mean crystal grain size may be adjusted by varying the particle size of the starting material of the dielectric particles or the baking conditions (baking time, baking temperature etc.).

If the mean crystal grain size of the dielectric particles is less than 0.10 µm, the dielectric constant is markedly reduced and becomes 800 or less when a DC bias of 8 V/µm is applied. Furthermore, if the mean crystal grain size of the dielectric particles exceeds 1.0 µm, there is a deterioration in the insulation resistance at high temperatures and the insulation resistivity at 150° C. becomes less than $10^{12}$ Ω·cm.

The mean crystal grain size of the dielectric particles according to the present invention is determined by the chord method. The method for determining the mean crystal grain size by means of the chord method will be described below. It should be noted that in the following explanation, the mean crystal grain size may be referred to as D.

First of all, an image is captured by a microscope on a measurement surface for measuring the mean crystal grain size D. A straight line is drawn anywhere in the image and the length of the straight line within the image is taken as L. The number N of intersections between the straight line and grain boundaries is measured, and L is divided by N to obtain the mean length between grain boundaries. If the dielectric particles are assumed to be large spheres of equal size, a value corresponding to the abovementioned mean length multiplied by 1.5 is taken as the mean crystal grain size D.

It should be noted that there is no particular limitation as to the magnification of the image, but an image is preferably captured at a magnification of 5000 to 50 000 times. Furthermore, a plurality of straight lines are drawn in a plurality of images in such a way that the number N of intersections is at least 100 and preferably at least 300. There is no particular limitation as to the number of lines.

In the present application, the dielectric particles are assumed to be large spheres of equal size for measurement of the mean crystal grain size D. That is to say, in the present application, the mean crystal grain size D is calculated by means of formula (2).

$$D=1.5\times(L/N) \qquad (2)$$

Furthermore, the dielectric composition according to the present invention may also contain lithium oxide ($Li_2O$) and/or potassium oxide ($K_2O$) as auxiliary components. In the following description, these auxiliary components may be referred to as auxiliary component A. During baking, the auxiliary component A has the effect of promoting sintering at low temperature and has the effect of suppressing grain growth in the dielectric particles. The content of the auxiliary component A is preferably at least 5 molar parts when the content of the main component Ti is 100 molar parts, in order to adequately achieve the abovementioned effects. Furthermore, in order to maintain high insulation resistance, the content of the auxiliary component A is preferably no greater than 18 molar parts. It should be noted that the content of the auxiliary component A is the total of the content of lithium oxide as Li equivalent and the content of potassium oxide as K equivalent.

Furthermore, the dielectric composition according to the present invention may contain, separately from the auxiliary component A, one or more oxides selected from the group consisting of copper oxide (CuO), manganese oxide ($MnO_2$), zinc oxide (ZnO), magnesium oxide (MgO) and cobalt oxide ($Co_3O_4$). In the following description, these auxiliary components may also be referred to as auxiliary component M. The auxiliary component M demonstrates the effect of promoting sintering and the effect of suppressing a drop in insulation resistance during baking under a reducing atmosphere. That is to say, the auxiliary component M has the effect of bringing the dielectric composition close to non-reductive. The content of the auxiliary component M is preferably between 0.2 molar parts and 1.5 molar parts when the content of the main component Ti is 100 molar parts, and more preferably between 0.2 molar parts and 0.5 molar parts, in order to adequately demonstrate the abovementioned effects. It should be noted that the content of the auxiliary component M is the total of the content of copper oxide as Cu equivalent, the content of manganese oxide as Mn equivalent, the content of zinc oxide as Zn equivalent, the content of magnesium oxide as Mg equivalent and the content of cobalt oxide as Co equivalent.

Various conditions such as the number of laminations and the thickness etc. of the dielectric layers 2 should be determined as appropriate according to the aim or the application. The thickness of the dielectric layers 2 is normally no greater than 30 µm and is preferably no greater than 10 µm from the point of view of compactness.

The laminated ceramic capacitor 1 according to a mode of embodiment of the present invention can increase the capacity and can properly maintain the insulation resistance at high temperatures when the thickness of the dielectric layers 2 is reduced to no greater than 10 µm. It should be noted that there is no particular restriction as to the lower limit for the thickness of the dielectric layers 2, but it is preferably no less than 1 µm in order to facilitate properly maintaining the insulation resistance at high temperatures. Furthermore, the number of laminations in the dielectric layers 2 is normally around 50-1000.

The internal electrode layers 3 are provided alternately with the dielectric layers 2 and are stacked in such a way that the end surfaces thereof are alternately exposed at the two opposing ends of the capacitor element main body 10. Furthermore, the pair of external electrodes 4 are formed at both ends of the capacitor element main body 10, and are connected to the exposed end surfaces of the alternately-arranged internal electrode layers 3 to form the laminated ceramic capacitor 1.

The internal electrode layers 3 are formed from a conductive material which is a noble metal or a base metal that acts essentially as an electrode. Specifically, the noble metal or base metal conductive material comprises any of Ag, Ag alloy, Cu or Cu alloy. There is no particular limitation as to metals other than Ag or Cu which are contained in the Ag alloy or Cu alloy, but one or more metals selected from Ni, Mn, Cr, Co, Al and W are preferred. Furthermore, if Ag alloy is used, the Ag content is preferably at least 95 wt % when the Ag alloy is taken as 100 wt %. If Cu alloy is used, the Cu content is preferably at least 95 wt % when the Cu alloy is taken as 100 wt %.

Various trace components such as P, C, Nb, Fe, Cl, B, Li, Na, K, F and S may also be included in the conductive material in a total amount of no greater than 0.1%.

Various conditions such as the number of laminations and the thickness etc. of the internal electrode layers 3 should be determined as appropriate in accordance with the aim or application. The thickness of the internal electrode layers 3 is preferably around 0.1 µm-4.0 µm and more preferably 0.2 µm-3.0 µm.

The external electrodes 4 are electrodes which conduct with the internal electrode layers 3 disposed alternately inside the laminated dielectric element main body 10, and are formed as a pair at both ends of the laminated dielectric element main body 10. There is no particular limitation as to the metal forming the external electrodes 4. One type of metal selected from Ni, Pd, Ag, Au, Cu, Pt, Rh, Ru and Ir etc.

may be used alone, or an alloy of two or more metals may be used. Cu, Cu alloy, Ni, Ni alloy, Ag, Ag—Pd alloy, or In—Ga alloy or the like is normally used for the external electrodes 4.

The thickness of the external electrodes 4 should be determined as appropriate in accordance with the application etc. The thickness of the external electrodes 4 is preferably around 10-200 VIM.

(Method for Producing the Laminated Ceramic Capacitor)

There is no particular limitation as to the method for producing the laminated ceramic capacitor according to the present invention. For example, it may be produced in the same way as a conventional laminated ceramic capacitor, by preparing a green chip using a normal sheet method or printing method employing a paste, baking the green chip and then printing or transcribing the external electrodes and then baking. The method for producing the laminated ceramic capacitor will be described in specific terms below.

There is no particular limitation as to the type of paste used for the dielectric ceramic layers. For example, the paste may be an organic paint comprising a mixture of a dielectric starting material and an organic vehicle, or it may be an aqueous paint comprising a mixture of a dielectric starting material and an aqueous vehicle.

For the dielectric starting material, it is possible to use a metal contained in the main component and the auxiliary component, for example, an oxide of a metal selected from the group consisting of Bi, Na, Sr, Ln, Ti, Li, K, Cu, Mn, Zn, Mg and Co, or a mixture thereof, or a composite oxide may be used. In addition, the dielectric starting material may be appropriately selected from various types of compounds which form the abovementioned oxides or composite oxides as a result of baking, e.g., carbonates, oxalates, nitrates, hydroxides and organometallic compounds etc. and these may be mixed for use. The content of each compound in the dielectric starting material should be determined in such a way that the abovementioned dielectric composition is formed after baking. A powder having a mean particle size of the order of 0.1-3 μm is normally used as the dielectric starting material. The dielectric starting material is preferably a powder having a mean particle size of 0.1-1 μm. Furthermore, the mean particle size of the dielectric starting material may be adjusted by appropriately varying the time for which the starting material is mixed.

When the paste for the dielectric layers is an organic paint, the dielectric starting material and an organic vehicle in which a binder or the like is dissolved in an organic solvent should be mixed. There is no particular limitation as to the binder which is used in the organic vehicle, and it should be appropriately selected from various normal binders such as ethyl cellulose and polyvinyl butyral. Furthermore, there is no particular limitation as to the organic solvent which is used in the organic vehicle, and it should be appropriately selected from various types of organic solvents such as terpineol, butyl carbitol, acetone and toluene, in accordance with the method which is used, namely the printing method or sheet method etc.

Furthermore, when the paste for the dielectric layers is an aqueous paint, the dielectric starting material and an aqueous vehicle in which a water-soluble binder and a dispersant etc. are dissolved in water should be mixed. There is no particular limitation as to the water-soluble binder which is used in the aqueous vehicle, and examples of binders which may be used include polyvinyl alcohol, cellulose and water-soluble acrylic resin.

The paste for the internal electrode layers is prepared by mixing a conductive material comprising various types of the abovementioned metals or alloys, or various types of compounds which form the conductive material after baking, organometallic compounds, resinates, and the like, with the abovementioned organic vehicle or aqueous vehicle. The paste for the external electrodes may be prepared in the same way as the paste for the internal electrodes.

When an organic vehicle is used to prepare the abovementioned pastes, there is no particular limitation as to the content of said organic vehicle. For example, the binder may be present in an amount of the order of 1-5 wt % and the organic solvent may be present in an amount of the order of 10-50 wt %. Furthermore, the pastes may contain additives selected from various types of dispersants, plasticizers, dielectrics, and insulators etc., as required. The total content of these additives is preferably no greater than 10 wt %.

When a printing method is used, the paste for the dielectric layers and the paste for the internal electrode layers are printed in layers on a substrate made of polyethylene terephthalate (PET) or the like and cut to a predetermined shape, after which they are peeled from the substrate to form a green chip. Furthermore, when the sheet method is used, a green sheet is formed using the paste for the dielectric layers, and the paste for the internal electrode layers is printed on the green sheet, after which the green sheets are stacked to form a green chip.

Before the green chip is baked, a debinding treatment is performed. There is no particular limitation as to the conditions of the debinding treatment and it should be carried out under normal conditions.

When a single base metal or alloy comprising base metals, such as Cu or Cu alloy, is used as the conductive material for the internal electrode layers, the debinding treatment is preferably carried out under a reducing atmosphere. There is no particular limitation as to the type of reducing atmosphere, and it is possible to use humidified $N_2$ gas or a mixed gas comprising humidified $N_2$ and $H_2$, for example.

There is no particular limitation as to the temperature increase rate, holding rate or temperature holding time in the debinding treatment. The temperature increase rate is preferably 0.1-100° C./hr, and more preferably 1-10° C./hr. The holding temperature is preferably 200-500° C. and more preferably 300-450° C. The temperature holding time is preferably 1-48 hours and more preferably 2-24 hours. The organic component of the binder component etc. is preferably removed by means of the debinding treatment down to around 300 ppm, and more preferably it is removed down to around 200 ppm.

The atmosphere under which the green chip is baked to obtain the capacitor element main body should be appropriately selected according to the type of conductive material in the paste for the internal electrode layers.

When a single base metal or alloy comprising base metals, such as Cu or Cu alloy, is used as the conductive material in the paste for the internal electrode layers, the oxygen partial pressure in the baking atmosphere is preferably between $10^{-6}$ and $10^{-8}$ atm. By setting the oxygen partial pressure at $10^{-8}$ atm or greater, it is possible to suppress a drop in insulation resistance and degradation of the components forming the dielectric layers. Furthermore, by setting the oxygen partial pressure at $10^{-6}$ atm or less, it is possible to suppress oxidation of the internal electrode layers.

Furthermore, the holding temperature during baking is preferably 900-1100° C. and more preferably 950-1050° C. By setting the holding temperature at 900° C. or greater, this makes densification more likely to progress adequately due to baking. Furthermore, by setting the holding temperature at 1100° C. or less, this facilitates suppressing diffusion of the various materials forming the internal electrode layers and abnormal sintering of the internal electrode layers. By suppressing abnormal sintering of the internal electrode layers, this facilitates preventing breakage of the internal electrodes. By suppressing diffusion of the various materials forming the internal electrode layers, this facilitates preventing deterioration of the DC bias characteristics.

By appropriately setting the holding temperature during baking within the abovementioned temperature ranges, this facilitates obtaining the required crystal grain size. Furthermore, there is no particular limitation as to the baking atmosphere. The baking atmosphere is preferably a reducing atmosphere in order to suppress oxidation of the internal electrode layers. There is no particular restriction as to the gas atmosphere. A mixed gas comprising $N_2$ and $H_2$ is preferably humidified for use as the gas atmosphere, for example. Furthermore, there is no particular limitation as to the baking time.

When the laminated ceramic capacitor according to this mode of embodiment is produced, annealing (re-oxidation) may be carried out. The annealing should be carried out under normal conditions. There is no particular limitation as to the annealing atmosphere. It is possible to use humidified $N_2$ gas or a mixed gas comprising humidified $N_2$ and $H_2$, for example.

In order to humidify the $N_2$ gas or mixed gas comprising $N_2$ and $H_2$, in the abovementioned debinding, baking and annealing, a wetter or the like should be used, for example. In this case, the water temperature is preferably around 20-90° C.

The debinding, baking and annealing may be carried out consecutively or independently. When they are carried out consecutively, the debinding is preferably carried out, after which the atmosphere is changed without cooling, and then the temperature is raised to the baking holding temperature and baking is carried out. On the other hand, when they are carried out independently, during the baking, the temperature is preferably raised under an $N_2$ gas atmosphere to the holding temperature for the debinding treatment, after which the atmosphere is changed and then a further temperature increase is continued, and following the baking, cooling is preferably carried out to the holding temperature for the debinding treatment, after which the atmosphere is once again changed to an $N_2$ gas atmosphere and further cooling is continued. It should be noted that the abovementioned $N_2$ gas may or may not be humidified.

The end surfaces of the capacitor element main body obtained in this way are polished by means of barrel polishing or sandblasting, for example, the paste for the external electrodes is printed or transcribed thereon, baking is carried out and the external electrodes are formed. The paste for the external electrodes is preferably baked under a mixed gas comprising humidified $N_2$ and $H_2$ at 600-800° C. for a time of around 10 minutes to 1 hour, for example. A coating layer is formed by means of plating or the like on the external electrode surface, as required.

There is no particular limitation as to the application of the laminated ceramic capacitor according to a mode of embodiment of the present invention produced in this way. For example, it may be mounted on a printed circuit board or the like by means of solder or the like, or it may be used in various types of electronic devices, e.g., a mobile telephone or a digital television etc.

The laminated ceramic capacitor and the method for producing same in accordance with a mode of embodiment of the present invention have been described above, but the present invention is not limited in any way to this mode of embodiment and various modes may of course be implemented with a scope that does not depart from the essential point of the present invention.

The present invention will be described in further detail below with the aid of exemplary embodiments and comparative examples. However the present invention is not limited to the following exemplary embodiments.

A starting material powder for the main component and a starting material powder for the auxiliary component indicated below were first of all prepared as starting materials for producing the dielectric ceramic layers. It should be noted that the mean particle size of the starting material powders prepared was 0.1-1 μm in all cases.

The starting material powders of the main components ($Bi_2O_3$, $Na_2CO_3$, $SrCO_3$, $Ln_2O_3$ and $TiO_2$) were weighed out in such a way that the dielectric compositions after baking satisfied the compositions in table 1 to table 3, then they were wet-mixed by means of a ball mill, after which the resulting mixtures were calcined for 2 hours at 750° C.-850° C. under the air, and main component powders were prepared. Ln is one element selected from among La, Nd, Sm, Gd, Dy and Yb. In table 1 to table 3, a, b, c and d denote numerical values of a, b, c and d in the following formula (1).

$$(Bi_aNa_bSr_cLn_d)TiO_3 \qquad (1)$$

Starting material powders of the auxiliary components ($Li_2CO_3$, $K_2CO_3$, $CuO$, $MnCO_3$, $ZnO$, $MgO$ and $Co_3O_4$) were then prepared. The starting material powders were weighed out in such a way that the compositions after baking achieve the molar parts shown in table 1 to table 3 with respect to 100 molar parts in terms of Ti content in the main component, they were then mixed with the main component powders and mixed powders were obtained.

An organic solvent and an organic vehicle were then added to the mixed powders and the materials were wet-mixed using a ball mill to prepare pastes for the dielectric layers. At the same time, Ag powder, Ag—Pd alloy powder or Cu powder was mixed with the organic vehicle as a conductive material powder, and Ag, Ag—Pd alloy or Cu pastes for various types of internal electrode layers were prepared. The pastes for the dielectric layers were then moulded into sheets by means of a sheet-moulding method, and ceramic green sheets having a thickness of 10 μm were obtained.

The paste for the internal electrode layers was coated on the ceramic green sheets by means of screen printing to print the internal electrode layers. The ceramic green sheets on which the internal electrode layers had been printed were laminated, after which they were cut into block shapes having dimensions of 4.5×4.3×1.0 mm, whereby laminated green chips were prepared. The thickness of the internal electrode layers was 2 μm and the number of laminations was 10. The laminated green chips were subjected to debinding at 300° C.-500° C. and the organic component was removed down to around 300 ppm. After the debinding, the green chips were baked under the atmosphere or under a reducing atmosphere at 850° C.-1100° C. The baking time was varied as appropriate. When the baking was carried out under a reducing atmosphere, the gas atmosphere which was used was a mixed gas comprising humidified $N_2$ and $H_2$. After the baking, the exposed surfaces of the internal electrodes were polished, a paste for the external electrodes having Ag or Cu as a conductive material was applied thereto, and laminated ceramic capacitors were obtained.

Moreover, it was confirmed that the compositions were the same as those shown in table 1 to table 3 by dissolving the dielectric layers of the baked laminated green chips in a solvent and performing ICP optical emission spectroscopy.

The mean crystal grain size of the dielectric particles forming the dielectric layers was also measured. The chord method was used to measure the mean crystal grain size of the dialectic particles. A photograph of the dielectric layers was captured at a magnification of 10 000-20 000 times using an electron microscope (Hitachi High-Tech, S-4700). A straight line was drawn on a plurality of photographs in such a way that the number N of intersections between the straight line and the grain boundaries was about 300, and the mean crystal grain size D was calculated.

The capacitance when a DC bias of 8 V/μm was applied at room temperature of 25° C. with an AC voltage of 0.1 V/μm superimposed, and the insulation resistance at 150° C. were further measured for each of the laminated ceramic capacitors prepared. The dielectric constant and insulation resistivity were further calculated from the capacitance, insulation resistance, electrode surface area and distance between dielectric layers.

A DC high-voltage power source (Glassman High Voltage, WX10P90) was connected to a digital LCR meter (Hewlett-Packard, 4284A), and the capacitance was measured by said digital LCR meter at room temperature of 25° C. while a DC bias of 8 V/μm was applied to each of the laminated ceramic capacitors.

The insulation resistance was obtained by using a DC high-voltage power source (Glassman High Voltage, WX10P90) to apply a voltage corresponding to 8 V/μm to each of the laminated ceramic capacitors and measuring the current value inside a thermostatic tank at 150° C.

The dielectric constant when a DC bias of 8 V/μm was applied at room temperature of 25° C., and the insulation resistivity at 150° C. for each of the exemplary embodiments and comparative examples are shown in table 1 to table 3. A dielectric constant of 800 or greater when a DC bias of 8 V/μm was applied was deemed to be good. Furthermore, insulation resistivity of $10^{12}$ Ω·cm or greater was deemed to be good.

TABLE 1

| | Main component $(Bi_a Na_b Sr_c Ln_d) TiO_3$ | | | | | | Auxiliary component A Content (molar parts) with respect to 100 molar part of Ti | |
|---|---|---|---|---|---|---|---|---|
| | Number of atoms when number of Ti atoms is 1 | | | | | Type | | |
| | a (Bi) | b (Na) | c (Sr) | d (Ln) | a + b + c + d | of Ln | Li | K |
| Comparative Example 1 | 0.345 | 0.350 | 0.200 | 0.000 | 0.895 | La | 0.00 | 0.00 |
| Comparative Example 2 | 0.425 | 0.425 | 0.210 | 0.000 | 1.060 | La | 0.00 | 0.00 |
| Comparative Example 3 | 0.400 | 0.390 | 0.210 | 0.000 | 1.000 | La | 0.00 | 0.00 |
| Exemplary Embodiment 1 | 0.480 | 0.480 | 0.010 | 0.010 | 0.980 | La | 0.00 | 0.00 |
| Exemplary Embodiment 2 | 0.450 | 0.450 | 0.100 | 0.010 | 1.010 | La | 0.00 | 0.00 |
| Exemplary Embodiment 3 | 0.425 | 0.425 | 0.100 | 0.010 | 0.960 | La | 0.00 | 5.00 |
| Exemplary Embodiment 4 | 0.400 | 0.400 | 0.200 | 0.010 | 1.010 | La | 0.00 | 0.00 |
| Exemplary Embodiment 5 | 0.240 | 0.240 | 0.510 | 0.010 | 1.000 | La | 0.00 | 0.00 |
| Exemplary Embodiment 6 | 0.130 | 0.130 | 0.680 | 0.010 | 0.950 | La | 0.00 | 9.00 |
| Exemplary Embodiment 7 | 0.150 | 0.150 | 0.700 | 0.010 | 1.010 | La | 0.00 | 0.00 |
| Exemplary Embodiment 8 | 0.100 | 0.100 | 0.800 | 0.010 | 1.010 | La | 0.00 | 0.00 |
| Exemplary Embodiment 9 | 0.480 | 0.480 | 0.010 | 0.010 | 0.980 | La | 5.00 | 0.00 |
| Exemplary Embodiment 10 | 0.380 | 0.380 | 0.180 | 0.010 | 0.950 | La | 5.00 | 0.00 |
| Exemplary Embodiment 11 | 0.380 | 0.380 | 0.180 | 0.010 | 0.950 | La | 5.00 | 0.00 |
| Exemplary Embodiment 12 | 0.100 | 0.100 | 0.800 | 0.010 | 1.010 | La | 5.00 | 0.00 |
| Exemplary Embodiment 13 | 0.235 | 0.235 | 0.475 | 0.010 | 0.955 | La | 9.00 | 0.00 |
| Exemplary Embodiment 14 | 0.357 | 0.357 | 0.204 | 0.033 | 0.951 | La | 0.00 | 0.00 |
| Exemplary Embodiment 15 | 0.340 | 0.340 | 0.204 | 0.033 | 0.917 | La | 0.00 | 18.00 |
| Exemplary Embodiment 16 | 0.306 | 0.306 | 0.306 | 0.033 | 0.951 | La | 0.00 | 0.00 |
| Exemplary Embodiment 17 | 0.230 | 0.230 | 0.458 | 0.033 | 0.951 | La | 0.00 | 0.00 |
| Exemplary Embodiment 18 | 0.230 | 0.230 | 0.458 | 0.033 | 0.951 | La | 0.00 | 0.00 |
| Exemplary Embodiment 19 | 0.230 | 0.230 | 0.458 | 0.033 | 0.951 | La | 0.00 | 0.00 |
| Exemplary Embodiment 20 | 0.230 | 0.230 | 0.458 | 0.033 | 0.951 | La | 0.00 | 0.00 |

TABLE 1-continued

| | | | | | | | | |
|---|---|---|---|---|---|---|---|---|
| Exemplary Embodiment 21 | 0.230 | 0.230 | 0.458 | 0.033 | 0.951 | La | 0.00 | 0.00 |
| Exemplary Embodiment 22 | 0.230 | 0.230 | 0.458 | 0.033 | 0.951 | La | 0.00 | 0.00 |
| Exemplary Embodiment 23 | 0.230 | 0.230 | 0.458 | 0.033 | 0.951 | La | 0.00 | 0.00 |
| Exemplary Embodiment 24 | 0.230 | 0.230 | 0.458 | 0.033 | 0.951 | La | 0.00 | 0.00 |
| Exemplary Embodiment 25 | 0.230 | 0.230 | 0.458 | 0.033 | 0.951 | La | 0.00 | 0.00 |
| Exemplary Embodiment 26 | 0.230 | 0.230 | 0.458 | 0.033 | 0.951 | La | 0.00 | 0.00 |
| Exemplary Embodiment 27 | 0.230 | 0.230 | 0.458 | 0.033 | 0.951 | La | 0.00 | 0.00 |
| Comparative Example 4 | 0.152 | 0.152 | 0.614 | 0.033 | 0.951 | La | 0.00 | 0.00 |
| Exemplary Embodiment 28 | 0.152 | 0.152 | 0.614 | 0.033 | 0.951 | La | 0.00 | 0.00 |
| Exemplary Embodiment 29 | 0.074 | 0.074 | 0.770 | 0.033 | 0.951 | La | 0.00 | 0.00 |
| Exemplary Embodiment 30 | 0.230 | 0.230 | 0.458 | 0.033 | 0.951 | La | 5.00 | 0.00 |
| Exemplary Embodiment 31 | 0.230 | 0.230 | 0.458 | 0.033 | 0.951 | La | 5.00 | 0.00 |

| | Auxiliary component M Content (molar parts) with respect to 100 molar parts of Ti | | | | | Mean crystal grain size | Dielectric constant @ 8 V/μm | Insulation resistivity @ 150° C. |
|---|---|---|---|---|---|---|---|---|
| | Cu | Zn | Mn | Mg | Co | μm | No units | Ωcm |
| Comparative Example 1 | 0.00 | 0.00 | 0.00 | 0.00 | 0.00 | 2.24 | 600 | $1 \times 10^{11}$ |
| Comparative Example 2 | 0.00 | 0.00 | 0.00 | 0.00 | 0.00 | 3.42 | 780 | $2 \times 10^{11}$ |
| Comparative Example 3 | 0.00 | 0.00 | 0.00 | 0.00 | 0.00 | 0.98 | 700 | $8 \times 10^{11}$ |
| Exemplary Embodiment 1 | 0.00 | 0.00 | 0.00 | 0.00 | 0.00 | 0.99 | 810 | $3 \times 10^{12}$ |
| Exemplary Embodiment 2 | 0.00 | 0.00 | 0.00 | 0.00 | 0.00 | 0.98 | 1190 | $2 \times 10^{12}$ |
| Exemplary Embodiment 3 | 0.00 | 0.00 | 0.00 | 0.00 | 0.00 | 0.50 | 1120 | $1 \times 10^{13}$ |
| Exemplary Embodiment 4 | 0.00 | 0.00 | 0.00 | 0.00 | 0.00 | 0.96 | 1010 | $2 \times 10^{12}$ |
| Exemplary Embodiment 5 | 0.00 | 0.00 | 0.00 | 0.00 | 0.00 | 0.89 | 1340 | $6 \times 10^{12}$ |
| Exemplary Embodiment 6 | 0.00 | 0.00 | 0.00 | 0.00 | 0.00 | 0.33 | 850 | $2 \times 10^{13}$ |
| Exemplary Embodiment 7 | 0.00 | 0.00 | 0.00 | 0.00 | 0.00 | 0.94 | 1040 | $5 \times 10^{12}$ |
| Exemplary Embodiment 8 | 0.00 | 0.00 | 0.00 | 0.00 | 0.00 | 0.96 | 820 | $6 \times 10^{12}$ |
| Exemplary Embodiment 9 | 0.00 | 0.00 | 0.00 | 0.00 | 0.00 | 0.44 | 800 | $1 \times 10^{13}$ |
| Exemplary Embodiment 10 | 0.00 | 0.00 | 0.00 | 0.00 | 0.00 | 0.32 | 1400 | $4 \times 10^{13}$ |
| Exemplary Embodiment 11 | 1.00 | 0.00 | 0.00 | 0.00 | 0.00 | 0.37 | 1370 | $1 \times 10^{14}$ |
| Exemplary Embodiment 12 | 0.00 | 0.00 | 0.00 | 0.00 | 0.00 | 0.44 | 810 | $2 \times 10^{13}$ |
| Exemplary Embodiment 13 | 0.00 | 0.00 | 0.00 | 0.00 | 0.00 | 0.23 | 1180 | $3 \times 10^{13}$ |
| Exemplary Embodiment 14 | 0.00 | 0.00 | 0.00 | 0.00 | 0.00 | 0.97 | 1800 | $5 \times 10^{12}$ |
| Exemplary Embodiment 15 | 0.00 | 0.00 | 0.00 | 0.00 | 0.00 | 0.32 | 1020 | $2 \times 10^{13}$ |
| Exemplary Embodiment 16 | 0.00 | 0.00 | 0.00 | 0.00 | 0.00 | 0.90 | 2000 | $7 \times 10^{12}$ |
| Exemplary Embodiment 17 | 1.00 | 0.00 | 0.00 | 0.00 | 0.00 | 0.97 | 1620 | $5 \times 10^{13}$ |
| Exemplary Embodiment 18 | 0.00 | 0.00 | 0.00 | 1.00 | 0.00 | 0.99 | 1590 | $1 \times 10^{13}$ |
| Exemplary Embodiment 19 | 0.00 | 0.00 | 0.00 | 0.20 | 0.00 | 0.96 | 1550 | $1 \times 10^{13}$ |
| Exemplary Embodiment 20 | 0.00 | 0.00 | 0.00 | 0.00 | 0.00 | 0.89 | 1550 | $3 \times 10^{12}$ |
| Exemplary Embodiment 21 | 0.20 | 0.00 | 0.00 | 0.00 | 0.00 | 0.88 | 1490 | $2 \times 10^{13}$ |
| Exemplary Embodiment 22 | 0.00 | 0.00 | 0.00 | 0.00 | 1.00 | 0.95 | 1470 | $1 \times 10^{13}$ |
| Exemplary Embodiment 23 | 0.00 | 0.00 | 0.00 | 0.00 | 0.20 | 0.95 | 1470 | $1 \times 10^{13}$ |

TABLE 1-continued

|  | | | | | | | | |
|---|---|---|---|---|---|---|---|---|
| Exemplary Embodiment 24 | 0.00 | 1.00 | 0.00 | 0.00 | 0.00 | 0.91 | 1400 | $4 \times 10^{13}$ |
| Exemplary Embodiment 25 | 0.00 | 0.20 | 0.00 | 0.00 | 0.00 | 0.93 | 1420 | $3 \times 10^{13}$ |
| Exemplary Embodiment 26 | 0.00 | 0.00 | 1.00 | 0.00 | 0.00 | 0.93 | 1320 | $3 \times 10^{13}$ |
| Exemplary Embodiment 27 | 0.00 | 0.00 | 0.20 | 0.00 | 0.00 | 0.94 | 1330 | $2 \times 10^{13}$ |
| Comparative Example 4 | 0.00 | 0.00 | 0.00 | 0.00 | 0.00 | 1.23 | 980 | $7 \times 10^{11}$ |
| Exemplary Embodiment 28 | 0.00 | 0.00 | 0.00 | 0.00 | 0.00 | 0.95 | 1050 | $2 \times 10^{12}$ |
| Exemplary Embodiment 29 | 0.00 | 0.00 | 0.00 | 0.00 | 0.00 | 0.92 | 950 | $3 \times 10^{12}$ |
| Exemplary Embodiment 30 | 0.20 | 0.00 | 0.00 | 0.00 | 0.00 | 0.25 | 1660 | $1 \times 10^{14}$ |
| Exemplary Embodiment 31 | 1.00 | 0.00 | 0.00 | 0.00 | 0.00 | 0.22 | 1550 | $2 \times 10^{14}$ |

TABLE 2

| | Main component (Bi$_a$Na$_b$Sr$_c$Ln$_d$)TiO$_3$ | | | | | | Auxiliary component A Content (molar parts) with respect to 100 molar parts of Ti | |
|---|---|---|---|---|---|---|---|---|
| | Number of atoms when number of Ti atoms is 1 | | | | | Type | | |
| | a (Bi) | b (Na) | c (Sr) | d (Ln) | a + b + c + d | of Ln | Li | K |
| Exemplary Embodiment 32 | 0.074 | 0.074 | 0.770 | 0.033 | 0.951 | La | 10.00 | 0.00 |
| Exemplary Embodiment 33 | 0.142 | 0.142 | 0.614 | 0.033 | 0.931 | La | 12.00 | 0.00 |
| Exemplary Embodiment 34 | 0.210 | 0.210 | 0.458 | 0.033 | 0.911 | La | 15.00 | 0.00 |
| Exemplary Embodiment 35 | 0.290 | 0.290 | 0.306 | 0.033 | 0.919 | La | 18.00 | 0.00 |
| Exemplary Embodiment 36 | 0.400 | 0.370 | 0.150 | 0.033 | 0.953 | La | 0.00 | 0.00 |
| Exemplary Embodiment 37 | 0.400 | 0.370 | 0.150 | 0.033 | 0.953 | La | 0.00 | 5.00 |
| Exemplary Embodiment 38 | 0.400 | 0.370 | 0.150 | 0.033 | 0.953 | La | 5.00 | 0.00 |
| Exemplary Embodiment 39 | 0.306 | 0.306 | 0.306 | 0.033 | 0.951 | La | 5.00 | 0.00 |
| Exemplary Embodiment 40 | 0.230 | 0.230 | 0.458 | 0.033 | 0.951 | La | 5.00 | 0.00 |
| Exemplary Embodiment 41 | 0.230 | 0.230 | 0.458 | 0.033 | 0.951 | Yb | 5.00 | 0.00 |
| Exemplary Embodiment 42 | 0.230 | 0.230 | 0.458 | 0.033 | 0.951 | Gd | 5.00 | 0.00 |
| Exemplary Embodiment 43 | 0.230 | 0.230 | 0.458 | 0.033 | 0.951 | Dy | 5.00 | 0.00 |
| Exemplary Embodiment 44 | 0.230 | 0.230 | 0.458 | 0.033 | 0.951 | Nd | 5.00 | 0.00 |
| Exemplary Embodiment 45 | 0.230 | 0.230 | 0.458 | 0.033 | 0.951 | Sm | 5.00 | 0.00 |
| Exemplary Embodiment 46 | 0.230 | 0.230 | 0.458 | 0.033 | 0.951 | Y | 5.00 | 0.00 |
| Exemplary Embodiment 47 | 0.230 | 0.230 | 0.458 | 0.033 | 0.951 | La | 7.00 | 0.00 |
| Exemplary Embodiment 48 | 0.230 | 0.230 | 0.458 | 0.033 | 0.951 | La | 9.00 | 0.00 |
| Exemplary Embodiment 49 | 0.230 | 0.230 | 0.458 | 0.033 | 0.951 | La | 11.00 | 0.00 |
| Exemplary Embodiment 50 | 0.370 | 0.370 | 0.185 | 0.050 | 0.975 | La | 5.00 | 0.00 |
| Exemplary Embodiment 51 | 0.150 | 0.150 | 0.600 | 0.050 | 0.950 | La | 11.00 | 0.00 |
| Exemplary Embodiment 52 | 0.350 | 0.350 | 0.200 | 0.050 | 0.950 | La | 0.00 | 0.00 |
| Exemplary Embodiment 53 | 0.300 | 0.300 | 0.300 | 0.050 | 0.950 | La | 0.00 | 0.00 |
| Exemplary Embodiment 54 | 0.225 | 0.225 | 0.450 | 0.050 | 0.950 | La | 0.00 | 0.00 |
| Exemplary Embodiment 55 | 0.238 | 0.238 | 0.475 | 0.050 | 1.001 | La | 0.00 | 0.00 |

TABLE 2-continued

| | | | | | | | | |
|---|---|---|---|---|---|---|---|---|
| Exemplary Embodiment 56 | 0.200 | 0.200 | 0.475 | 0.050 | 0.925 | La | 0.00 | 13.00 |
| Exemplary Embodiment 57 | 0.150 | 0.150 | 0.600 | 0.050 | 0.950 | La | 0.00 | 0.00 |
| Exemplary Embodiment 58 | 0.075 | 0.075 | 0.750 | 0.050 | 0.950 | La | 0.00 | 0.00 |
| Exemplary Embodiment 59 | 0.075 | 0.075 | 0.750 | 0.050 | 0.950 | La | 5.00 | 0.00 |
| Exemplary Embodiment 60 | 0.225 | 0.225 | 0.450 | 0.050 | 0.950 | La | 13.00 | 0.00 |
| Exemplary Embodiment 61 | 0.290 | 0.290 | 0.300 | 0.050 | 0.930 | La | 15.00 | 0.00 |
| Exemplary Embodiment 62 | 0.100 | 0.075 | 0.650 | 0.100 | 0.925 | La | 0.00 | 16.00 |
| Exemplary Embodiment 63 | 0.375 | 0.375 | 0.100 | 0.100 | 0.950 | La | 5.00 | 0.00 |
| Comparative Example 5 | 0.220 | 0.220 | 0.425 | 0.100 | 0.965 | La | 5.00 | 0.00 |
| Exemplary Embodiment 64 | 0.220 | 0.220 | 0.425 | 0.100 | 0.965 | La | 5.00 | 0.00 |

| | Auxiliary component M Content (molar parts) with respect to 100 molar parts of Ti | | | | | Mean crystal grain size | Dielectric constant @ 8 V/μm | Insulation resistivity @ 150° C. |
|---|---|---|---|---|---|---|---|---|
| | Cu | Zn | Mn | Mg | Co | μm | No units | Ωcm |
| Exemplary Embodiment 32 | 0.00 | 0.00 | 0.00 | 0.00 | 0.00 | 0.21 | 900 | $2 \times 10^{13}$ |
| Exemplary Embodiment 33 | 0.00 | 0.00 | 0.00 | 0.00 | 0.00 | 0.18 | 950 | $2 \times 10^{13}$ |
| Exemplary Embodiment 34 | 0.00 | 0.00 | 0.00 | 0.00 | 0.00 | 0.14 | 1200 | $1 \times 10^{13}$ |
| Exemplary Embodiment 35 | 0.00 | 0.00 | 0.00 | 0.00 | 0.00 | 0.11 | 1250 | $2 \times 10^{13}$ |
| Exemplary Embodiment 36 | 0.00 | 0.00 | 0.00 | 0.00 | 0.00 | 0.93 | 1420 | $3 \times 10^{12}$ |
| Exemplary Embodiment 37 | 0.00 | 0.00 | 0.00 | 0.00 | 0.00 | 0.41 | 1200 | $1 \times 10^{13}$ |
| Exemplary Embodiment 38 | 0.00 | 0.00 | 0.00 | 0.00 | 0.00 | 0.33 | 1350 | $1 \times 10^{13}$ |
| Exemplary Embodiment 39 | 0.00 | 0.00 | 0.00 | 0.00 | 0.00 | 0.27 | 1492 | $6 \times 10^{13}$ |
| Exemplary Embodiment 40 | 0.00 | 0.00 | 0.00 | 0.00 | 0.00 | 0.34 | 1670 | $5 \times 10^{13}$ |
| Exemplary Embodiment 41 | 0.00 | 0.00 | 0.00 | 0.00 | 0.00 | 0.34 | 1510 | $4 \times 10^{13}$ |
| Exemplary Embodiment 42 | 0.00 | 0.00 | 0.00 | 0.00 | 0.00 | 0.30 | 1500 | $3 \times 10^{13}$ |
| Exemplary Embodiment 43 | 0.00 | 0.00 | 0.00 | 0.00 | 0.00 | 0.28 | 1430 | $4 \times 10^{13}$ |
| Exemplary Embodiment 44 | 0.00 | 0.00 | 0.00 | 0.00 | 0.00 | 0.23 | 1340 | $2 \times 10^{13}$ |
| Exemplary Embodiment 45 | 0.00 | 0.00 | 0.00 | 0.00 | 0.00 | 0.25 | 1300 | $1 \times 10^{13}$ |
| Exemplary Embodiment 46 | 0.00 | 0.00 | 0.00 | 0.00 | 0.00 | 0.31 | 1250 | $5 \times 10^{13}$ |
| Exemplary Embodiment 47 | 0.00 | 0.00 | 0.00 | 0.00 | 0.00 | 0.25 | 1550 | $6 \times 10^{13}$ |
| Exemplary Embodiment 48 | 0.00 | 0.00 | 0.00 | 0.00 | 0.00 | 0.26 | 1400 | $4 \times 10^{13}$ |
| Exemplary Embodiment 49 | 0.00 | 0.00 | 0.00 | 0.00 | 0.00 | 0.22 | 1330 | $3 \times 10^{13}$ |
| Exemplary Embodiment 50 | 0.00 | 0.00 | 0.00 | 0.00 | 0.00 | 0.40 | 1350 | $3 \times 10^{13}$ |
| Exemplary Embodiment 51 | 0.00 | 0.00 | 0.00 | 0.00 | 0.00 | 0.20 | 1010 | $5 \times 10^{13}$ |
| Exemplary Embodiment 52 | 0.00 | 0.00 | 0.00 | 0.00 | 0.00 | 0.92 | 1700 | $4 \times 10^{12}$ |
| Exemplary Embodiment 53 | 0.00 | 0.00 | 0.00 | 0.00 | 0.00 | 0.98 | 1900 | $3 \times 10^{12}$ |
| Exemplary Embodiment 54 | 0.00 | 0.00 | 0.00 | 0.00 | 0.00 | 0.91 | 1450 | $6 \times 10^{12}$ |
| Exemplary Embodiment 55 | 0.00 | 0.00 | 0.00 | 0.00 | 0.00 | 0.90 | 1400 | $4 \times 10^{12}$ |
| Exemplary Embodiment 56 | 0.00 | 0.00 | 0.00 | 0.00 | 0.00 | 0.18 | 1230 | $3 \times 10^{13}$ |
| Exemplary Embodiment 57 | 0.00 | 0.00 | 0.00 | 0.00 | 0.00 | 0.88 | 1000 | $5 \times 10^{12}$ |

TABLE 2-continued

|  |  |  |  |  |  |  |  |  |
|---|---|---|---|---|---|---|---|---|
| Exemplary Embodiment 58 | 0.00 | 0.00 | 0.00 | 0.00 | 0.00 | 0.97 | 900 | $4 \times 10^{12}$ |
| Exemplary Embodiment 59 | 0.00 | 0.00 | 0.00 | 0.00 | 0.00 | 0.33 | 890 | $8 \times 10^{13}$ |
| Exemplary Embodiment 60 | 0.00 | 0.00 | 0.00 | 0.00 | 0.00 | 0.19 | 1200 | $1 \times 10^{13}$ |
| Exemplary Embodiment 61 | 0.00 | 0.00 | 0.00 | 0.00 | 0.00 | 0.15 | 1400 | $1 \times 10^{13}$ |
| Exemplary Embodiment 62 | 0.00 | 0.00 | 0.00 | 0.00 | 0.00 | 0.28 | 920 | $1 \times 10^{13}$ |
| Exemplary Embodiment 63 | 0.00 | 0.00 | 0.00 | 0.00 | 0.00 | 0.32 | 1170 | $5 \times 10^{13}$ |
| Comparative Example 5 | 0.00 | 0.00 | 0.00 | 0.00 | 0.00 | 0.09 | 650 | $1 \times 10^{13}$ |
| Exemplary Embodiment 64 | 0.00 | 0.00 | 0.00 | 0.00 | 0.00 | 0.19 | 930 | $3 \times 10^{13}$ |

TABLE 3

|  | Main component (Bi$_a$Na$_b$Sr$_c$Ln$_d$) TiO$_3$ | | | | | | Auxiliary component A Content (molar parts) with respect to 100 molar parts of Ti | |
|---|---|---|---|---|---|---|---|---|
|  | Number of atoms when number of Ti atoms is 1 | | | | | Type | | |
|  | a (Bi) | b (Na) | c (Sr) | d (Ln) | a + b + c + d | of Ln | Li | K |
| Exemplary Embodiment 65 | 0.375 | 0.375 | 0.100 | 0.100 | 0.950 | La | 10.00 | 0.00 |
| Exemplary Embodiment 66 | 0.100 | 0.075 | 0.650 | 0.100 | 0.925 | La | 16.00 | 0.00 |
| Exemplary Embodiment 67 | 0.130 | 0.130 | 0.550 | 0.100 | 0.910 | La | 18.00 | 0.00 |
| Exemplary Embodiment 68 | 0.450 | 0.450 | 0.010 | 0.100 | 1.010 | La | 0.00 | 0.00 |
| Exemplary Embodiment 69 | 0.400 | 0.400 | 0.100 | 0.100 | 1.000 | La | 0.00 | 0.00 |
| Exemplary Embodiment 70 | 0.331 | 0.331 | 0.189 | 0.100 | 0.951 | La | 0.00 | 0.00 |
| Exemplary Embodiment 71 | 0.284 | 0.283 | 0.284 | 0.100 | 0.951 | La | 0.00 | 0.00 |
| Exemplary Embodiment 72 | 0.225 | 0.225 | 0.450 | 0.100 | 1.000 | La | 0.00 | 0.00 |
| Exemplary Embodiment 73 | 0.138 | 0.138 | 0.575 | 0.100 | 0.951 | La | 0.00 | 0.00 |
| Exemplary Embodiment 74 | 0.100 | 0.100 | 0.700 | 0.100 | 1.000 | La | 0.00 | 0.00 |
| Exemplary Embodiment 75 | 0.076 | 0.075 | 0.700 | 0.100 | 0.951 | La | 0.00 | 0.00 |
| Exemplary Embodiment 76 | 0.055 | 0.055 | 0.800 | 0.100 | 1.010 | La | 0.00 | 0.00 |
| Exemplary Embodiment 77 | 0.450 | 0.450 | 0.010 | 0.100 | 1.010 | La | 5.00 | 0.00 |
| Exemplary Embodiment 78 | 0.284 | 0.283 | 0.284 | 0.100 | 0.951 | La | 5.00 | 0.00 |
| Exemplary Embodiment 79 | 0.100 | 0.100 | 0.700 | 0.100 | 1.000 | La | 5.00 | 0.00 |
| Exemplary Embodiment 80 | 0.076 | 0.075 | 0.700 | 0.100 | 0.951 | La | 5.00 | 0.00 |
| Exemplary Embodiment 81 | 0.055 | 0.055 | 0.800 | 0.100 | 1.010 | La | 5.00 | 0.00 |
| Exemplary Embodiment 82 | 0.331 | 0.331 | 0.189 | 0.100 | 0.951 | La | 10.00 | 0.00 |
| Exemplary Embodiment 83 | 0.311 | 0.311 | 0.178 | 0.150 | 0.950 | La | 0.00 | 0.00 |
| Exemplary Embodiment 84 | 0.267 | 0.266 | 0.267 | 0.150 | 0.950 | La | 0.00 | 0.00 |
| Exemplary Embodiment 85 | 0.200 | 0.200 | 0.400 | 0.150 | 0.950 | La | 0.00 | 0.00 |
| Exemplary Embodiment 86 | 0.132 | 0.132 | 0.536 | 0.150 | 0.950 | La | 0.00 | 0.00 |
| Exemplary Embodiment 87 | 0.065 | 0.065 | 0.670 | 0.150 | 0.950 | La | 0.00 | 0.00 |
| Exemplary Embodiment 88 | 0.311 | 0.311 | 0.178 | 0.150 | 0.950 | La | 5.00 | 0.00 |
| Exemplary Embodiment 89 | 0.267 | 0.266 | 0.267 | 0.150 | 0.950 | La | 5.00 | 0.00 |

TABLE 3-continued

| | | | | | | | | |
|---|---|---|---|---|---|---|---|---|
| Exemplary Embodiment 90 | 0.200 | 0.200 | 0.400 | 0.150 | 0.950 | La | 5.00 | 0.00 |
| Exemplary Embodiment 91 | 0.132 | 0.132 | 0.536 | 0.150 | 0.950 | La | 5.00 | 0.00 |
| Exemplary Embodiment 92 | 0.065 | 0.065 | 0.670 | 0.150 | 0.950 | La | 5.00 | 0.00 |
| Exemplary Embodiment 93 | 0.400 | 0.400 | 0.010 | 0.200 | 1.010 | La | 0.00 | 0.00 |
| Exemplary Embodiment 94 | 0.320 | 0.320 | 0.080 | 0.200 | 0.920 | La | 0.00 | 0.00 |
| Exemplary Embodiment 95 | 0.292 | 0.292 | 0.167 | 0.200 | 0.951 | La | 0.00 | 0.00 |
| Exemplary Embodiment 96 | 0.200 | 0.200 | 0.400 | 0.200 | 1.000 | La | 0.00 | 0.00 |
| Exemplary Embodiment 97 | 0.055 | 0.055 | 0.700 | 0.200 | 1.010 | La | 0.00 | 0.00 |
| Exemplary Embodiment 98 | 0.400 | 0.400 | 0.010 | 0.200 | 1.010 | La | 5.00 | 0.00 |
| Exemplary Embodiment 99 | 0.320 | 0.320 | 0.080 | 0.200 | 0.920 | La | 5.00 | 0.00 |
| Exemplary Embodiment 100 | 0.292 | 0.292 | 0.167 | 0.200 | 0.951 | La | 5.00 | 0.00 |
| Exemplary Embodiment 101 | 0.200 | 0.200 | 0.400 | 0.200 | 1.000 | La | 5.00 | 0.00 |
| Exemplary Embodiment 102 | 0.055 | 0.055 | 0.700 | 0.200 | 1.010 | La | 5.00 | 0.00 |

| | Auxiliary component M Content (molar parts) with respect to 100 molar parts of Ti | | | | | Mean crystal grain size | Dielectric constant @ 8 V/μm | Insulation resistivity @ 150° C. |
|---|---|---|---|---|---|---|---|---|
| | Cu | Zn | Mn | Mg | Co | μm | No units | Ωcm |
| Exemplary Embodiment 65 | 0.00 | 0.00 | 0.00 | 0.00 | 0.00 | 0.23 | 1160 | $2 \times 10^{13}$ |
| Exemplary Embodiment 66 | 0.00 | 0.00 | 0.00 | 0.00 | 0.00 | 0.29 | 920 | $1 \times 10^{13}$ |
| Exemplary Embodiment 67 | 0.00 | 0.00 | 0.00 | 0.00 | 0.00 | 0.21 | 940 | $1 \times 10^{13}$ |
| Exemplary Embodiment 68 | 0.00 | 0.00 | 0.00 | 0.00 | 0.00 | 0.88 | 1000 | $3 \times 10^{12}$ |
| Exemplary Embodiment 69 | 0.00 | 0.00 | 0.00 | 0.00 | 0.00 | 0.92 | 1050 | $4 \times 10^{12}$ |
| Exemplary Embodiment 70 | 0.00 | 0.00 | 0.00 | 0.00 | 0.00 | 0.89 | 1600 | $7 \times 10^{12}$ |
| Exemplary Embodiment 71 | 0.00 | 0.00 | 0.00 | 0.00 | 0.00 | 0.87 | 1800 | $9 \times 10^{12}$ |
| Exemplary Embodiment 72 | 0.00 | 0.00 | 0.00 | 0.00 | 0.00 | 0.95 | 1100 | $7 \times 10^{12}$ |
| Exemplary Embodiment 73 | 0.00 | 0.00 | 0.00 | 0.00 | 0.00 | 0.94 | 900 | $6 \times 10^{12}$ |
| Exemplary Embodiment 74 | 0.00 | 0.00 | 0.00 | 0.00 | 0.00 | 0.89 | 1000 | $8 \times 10^{12}$ |
| Exemplary Embodiment 75 | 0.00 | 0.00 | 0.00 | 0.00 | 0.00 | 0.93 | 830 | $4 \times 10^{12}$ |
| Exemplary Embodiment 76 | 0.00 | 0.00 | 0.00 | 0.00 | 0.00 | 0.99 | 800 | $7 \times 10^{12}$ |
| Exemplary Embodiment 77 | 0.00 | 0.00 | 0.00 | 0.00 | 0.00 | 0.26 | 950 | $2 \times 10^{13}$ |
| Exemplary Embodiment 78 | 0.00 | 0.00 | 0.00 | 0.00 | 0.00 | 0.13 | 1500 | $5 \times 10^{13}$ |
| Exemplary Embodiment 79 | 0.00 | 0.00 | 0.00 | 0.00 | 0.00 | 0.33 | 900 | $4 \times 10^{13}$ |
| Exemplary Embodiment 80 | 0.00 | 0.00 | 0.00 | 0.00 | 0.00 | 0.33 | 800 | $2 \times 10^{13}$ |
| Exemplary Embodiment 81 | 0.00 | 0.00 | 0.00 | 0.00 | 0.00 | 0.30 | 800 | $6 \times 10^{13}$ |
| Exemplary Embodiment 82 | 0.00 | 0.00 | 0.00 | 0.00 | 0.00 | 0.20 | 1185 | $6 \times 10^{13}$ |
| Exemplary Embodiment 83 | 0.00 | 0.00 | 0.00 | 0.00 | 0.00 | 0.87 | 1500 | $6 \times 10^{12}$ |
| Exemplary Embodiment 84 | 0.00 | 0.00 | 0.00 | 0.00 | 0.00 | 0.98 | 1700 | $5 \times 10^{12}$ |
| Exemplary Embodiment 85 | 0.00 | 0.00 | 0.00 | 0.00 | 0.00 | 0.95 | 1200 | $6 \times 10^{12}$ |
| Exemplary Embodiment 86 | 0.00 | 0.00 | 0.00 | 0.00 | 0.00 | 0.93 | 1000 | $8 \times 10^{12}$ |
| Exemplary Embodiment 87 | 0.00 | 0.00 | 0.00 | 0.00 | 0.00 | 0.92 | 810 | $9 \times 10^{12}$ |

TABLE 3-continued

| | | | | | | | | |
|---|---|---|---|---|---|---|---|---|
| Exemplary Embodiment 88 | 0.00 | 0.00 | 0.00 | 0.00 | 0.00 | 0.18 | 1300 | $6 \times 10^{13}$ |
| Exemplary Embodiment 89 | 0.00 | 0.00 | 0.00 | 0.00 | 0.00 | 0.19 | 1500 | $6 \times 10^{13}$ |
| Exemplary Embodiment 90 | 0.00 | 0.00 | 0.00 | 0.00 | 0.00 | 0.25 | 1080 | $6 \times 10^{13}$ |
| Exemplary Embodiment 91 | 0.00 | 0.00 | 0.00 | 0.00 | 0.00 | 0.24 | 930 | $7 \times 10^{13}$ |
| Exemplary Embodiment 92 | 0.00 | 0.00 | 0.00 | 0.00 | 0.00 | 0.30 | 820 | $6 \times 10^{13}$ |
| Exemplary Embodiment 93 | 0.00 | 0.00 | 0.00 | 0.00 | 0.00 | 0.85 | 850 | $8 \times 10^{12}$ |
| Exemplary Embodiment 94 | 0.00 | 0.00 | 0.00 | 0.00 | 0.00 | 0.97 | 940 | $3 \times 10^{12}$ |
| Exemplary Embodiment 95 | 0.00 | 0.00 | 0.00 | 0.00 | 0.00 | 0.93 | 1070 | $4 \times 10^{12}$ |
| Exemplary Embodiment 96 | 0.00 | 0.00 | 0.00 | 0.00 | 0.00 | 0.94 | 810 | $3 \times 10^{12}$ |
| Exemplary Embodiment 97 | 0.00 | 0.00 | 0.00 | 0.00 | 0.00 | 0.97 | 820 | $7 \times 10^{12}$ |
| Exemplary Embodiment 98 | 0.00 | 0.00 | 0.00 | 0.00 | 0.00 | 0.37 | 830 | $4 \times 10^{13}$ |
| Exemplary Embodiment 99 | 0.00 | 0.00 | 0.00 | 0.00 | 0.00 | 0.37 | 850 | $1 \times 10^{13}$ |
| Exemplary Embodiment 100 | 0.00 | 0.00 | 0.00 | 0.00 | 0.00 | 0.35 | 920 | $3 \times 10^{13}$ |
| Exemplary Embodiment 101 | 0.00 | 0.00 | 0.00 | 0.00 | 0.00 | 0.29 | 830 | $2 \times 10^{13}$ |
| Exemplary Embodiment 102 | 0.00 | 0.00 | 0.00 | 0.00 | 0.00 | 0.34 | 810 | $5 \times 10^{13}$ |

As is clear from the results of table 1 to table 3, it was confirmed that when the main component comprised Bi, Na, Sr, Ln and Ti and the mean crystal grain size of the dielectric particles was in the range of 0.1 μm-1 μm (Exemplary Embodiments 1-102), the insulation resistivity at 150° C. was $10^{12}$ Ω·cm or greater and the dielectric constant when a DC bias of 8 V/μm was applied was 800 or greater.

On the other hand, the results showed that in Comparative Examples 1 and 2 in which the mean crystal grain size of the dielectric particles exceeded 1 μm and the main component did not contain the rare earth element Ln, the dielectric constant and the insulation resistivity were both excessively low. The results further showed that in Comparative Example 3 in which the main component did not contain the rare earth element Ln, the dielectric constant and electrical resistivity were both excessively low, even though the mean crystal grain size of the dielectric particles was in the range of 0.1 μm-1 μm.

The results further showed that in Comparative Example 4 in which the mean crystal grain size of the dielectric particles was 1.23 μm, the insulation resistivity at 150° C. was excessively low at $7 \times 10^{11}$ Ω·cm. The results also showed that in Comparative Example 5 in which the mean crystal grain size of the dielectric particles was 0.09 μm, the dielectric constant when a DC bias was applied was excessively low at 650.

The invention claimed is:

1. A dielectric composition comprising:
   a perovskite compound comprising a main component having Bi, Na, Sr, Ln and Ti,
   wherein Ln is at least one type of a rare earth element, and
   wherein a mean crystal grain size is between 0.1 μm and 0.89 μm.

2. The dielectric composition according to claim 1, wherein the main component is represented by $(Bi_aNa_bSr_cLn_d)TiO_3$, and
   wherein a, b, c and d satisfy the following, respectively:
   $0<a<0.50$, $0<b<0.50$, $0<c\leq0.80$, $0<d\leq0.20$ and $0.90\leq a+b+c+d\leq1.05$.

3. The dielectric composition according to claim 1, wherein the dielectric composition comprises between 5 molar parts and 18 molar parts of at least one from the group consisting of Li and K as an auxiliary component, with respect to 100 molar parts of Ti contained in the main component.

4. The dielectric composition according to claim 1, wherein the dielectric composition comprises between 0.2 molar parts and 1 molar part of at least one from the group consisting of Cu, Mn, Zn, Mg and Co as an auxiliary component, with respect to 100 molar parts of Ti contained in the main component.

5. A dielectric element comprising the dielectric composition according to claim 1.

6. An electronic component including a dielectric layer comprising the dielectric composition according to claim 1.

7. A laminated electronic component comprising a laminated portion, wherein the laminated portion is formed by alternately laminating an internal electrode layer and a dielectric layer comprising the dielectric composition according to claim 1.

8. The laminated electronic component according to claim 7, wherein the internal electrode layer comprises a conductive material, and wherein the conductive material is a noble metal or a base metal that acts essentially as an electrode.

9. The laminated electronic component according to claim 8, wherein the noble metal or base metal comprises Cu or Cu alloy.

10. The laminated electronic component according to claim 7, wherein the laminated electronic component comprises external electrodes formed of a metal.

11. The laminated electronic component according to claim 10, wherein the external electrodes are formed of one type of metal selected from the group consisting of Ni, Pd, Ag, Au, Cu, Pt, Rh, Ru and Ir used alone or used as an alloy of two or more metals.

12. The laminated electronic component according to claim 7, wherein the laminated electronic component is a laminated ceramic capacitor.

13. A dielectric composition comprising:
a perovskite compound comprising a main component having Bi, Na, Sr, Ln and Ti,
wherein Ln is at least one type of a rare earth element, and
wherein a mean crystal grain size is between 0.1 μm and 0.50 μm.

14. The dielectric composition according to claim 13,
wherein the main component is represented by $(Bi_aNa_bSr_cLn_d)TiO_3$, and
wherein a, b, c and d satisfy the following, respectively: $0<a<0.50$, $0<b<0.50$, $0<c\leq0.80$, $0<d\leq0.20$ and $0.90\leq a+b+c+d\leq1.05$.

15. The dielectric composition according to claim 13, wherein the dielectric composition comprises between 5 molar parts and 18 molar parts of at least one from the group consisting of Li and K as an auxiliary component, with respect to 100 molar parts of Ti contained in the main component.

16. The dielectric composition according to claim 13, wherein the dielectric composition comprises between 0.2 molar parts and 1 molar part of at least one from the group consisting of Cu, Mn, Zn, Mg and Co as an auxiliary component, with respect to 100 molar parts of Ti contained in the main component.

17. A laminated electronic component comprising a laminated portion, wherein the laminated portion is formed by alternately laminating an internal electrode layer and a dielectric layer comprising the dielectric composition according to claim 13.

18. The laminated electronic component according to claim 17, wherein the internal electrode layer comprises a conductive material, and wherein the conductive material is a noble metal or a base metal that acts essentially as an electrode.

19. The dielectric composition according to claim 1, wherein the dielectric composition is configured to provide an insulation resistivity of $10^{12}$ Ωcm or greater at a high temperature.

* * * * *